Feb. 5, 1935. V. H. BODLE 1,989,676
DECORATED RUBBER ARTICLE AND PROCESS OF MAKING THE SAME
Filed Jan. 8, 1931
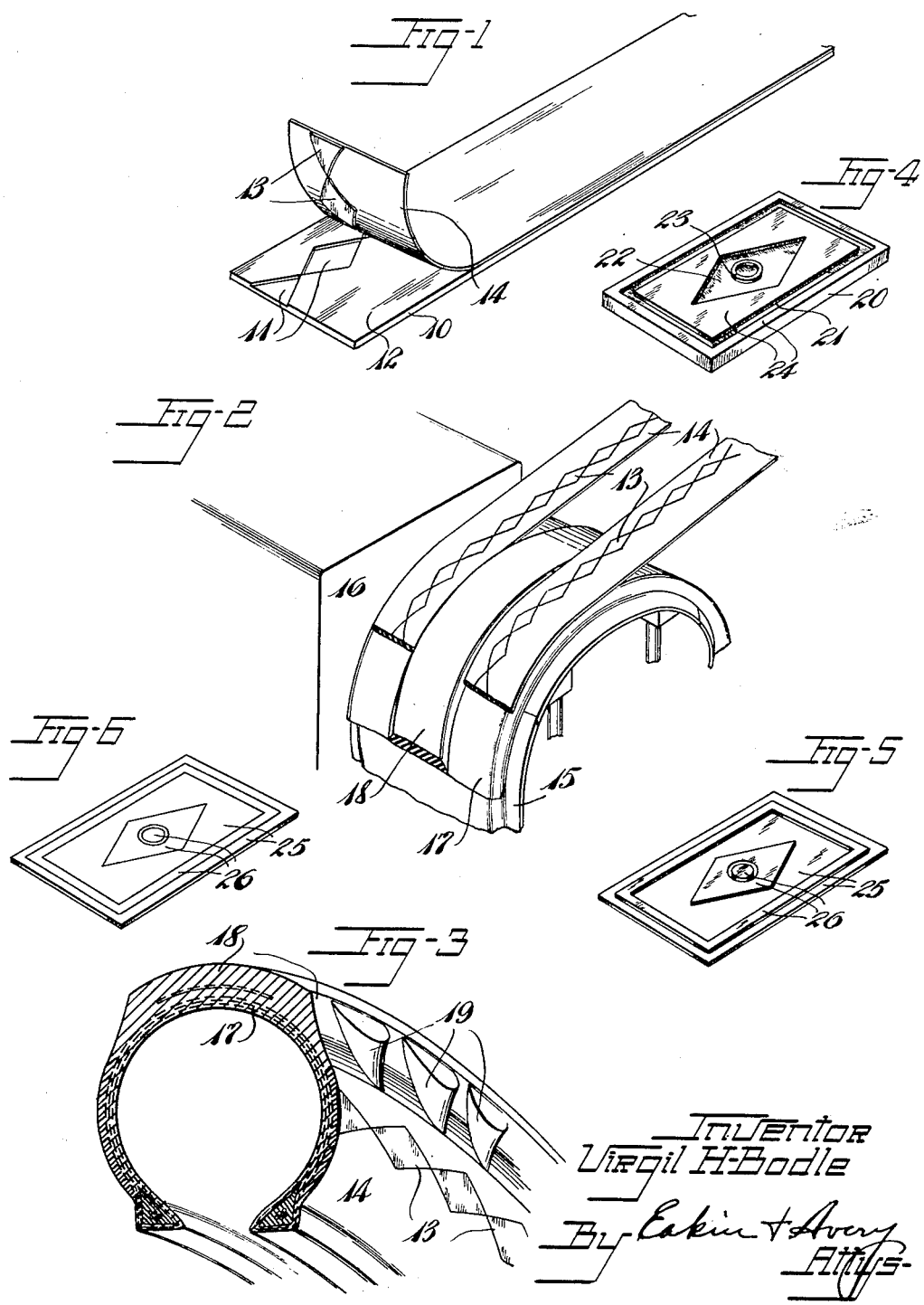
Inventor
Virgil H. Bodle
By Eakin + Avery
Attys.

Patented Feb. 5, 1935

1,989,676

UNITED STATES PATENT OFFICE 1,989,676

DECORATED RUBBER ARTICLE AND PROCESS OF MAKING THE SAME

Virgil H. Bodle, Newton, Mass., assignor to The B. F. Goodrich Company, New York, N. Y., a corporation of New York Application January 8, 1931, Serial No. 507,460

5 Claims. (Cl. 18—59)

This invention relates to the art of manufacturing rubber, and particularly to the manufacture of decorated rubber articles such as bicolored medallions, labels, etc. Among its principal objects are therefore the manufacture of such decorated rubber articles by a simple, economical method, the manufacture of decorated rubber articles in a plurality of colors, and the manufacture of such articles of a superior and hitherto unknown degree of beauty and durability. Other objects will be apparent from the following description of the invention.

This invention, in brief, consists in electrodepositing rubber from an aqueous dispersion of rubber on localized areas of an anode plate, and superimposing on the coagulated rubber deposits a continuous rubber backing. The electrodeposited rubber adheres to the rubber backing more closely than to the anode plate, hence when the backing is stripped from the plate it carries with it the electrodeposited rubber. The product is a decorated rubber article having electro-deposited rubber over those portions of its surface corresponding to the design carried by the anode plate.

In the accompanying drawing Fig. 1 is a representation of the manufacture of one embodiment of my invention, namely, a bicolored pneumatic tire sidewall. Fig. 2 illustrates the application of the sidewall to the tire in the course of its manufacture, and Fig. 3 shows a fragment of the finished tire. Fig. 4 shows a plate adapted to the manufacture of another embodiment of my invention, the product being shown in Fig. 5, and an alternative form of the product in Fig. 6.

In one embodiment of the invention a metallic plate 10, shown in Fig. 1, preferably of zinc, is provided with engraved depressions or cavities 11 which are here shown as consisting of a series of diamond-shaped figures or lozenges placed end to end. The surface of the plate is provided with an insulating coating 12 over its entire surface with the exception of the engraved cavities 11. The plate is then immersed in an aqueous dispersion of rubber, say a vulcanizable rubber latex which is colored red by the addition of a suspension of a red pigment, and is connected to the positive terminal of a suitable source of direct current, the negative terminal being connected to a cathode which is likewise immersed in the latex. The latex rubber is electrodeposited in the cavities 11 until its thickness is such as substantially to fill the cavities after drying. The plate 10 is then removed from the latex and the electrodeposits 13 are preferably dried, although they may if desired be handled wet and dried after they are removed on the backing sheet. The backing sheet 14, which may be of calendered, white, mill-mixed rubber is then rolled on the plate 10 in adhesive engagement with the deposits 13, and stripped from the plate, as indicated in Fig. 1, carrying with it the deposits 13.

The decorated sheet produced by the above-described process may be employed in the manufacture of pneumatic automobile tires. For example, a tire is built up on the conventional drum-type tire machine shown in Fig. 2, in which 15 is the upper portion of the collapsible drum and 16 is the gear-box which contains the driving mechanism for rotating the drum. The tire is built up in the usual manner by superimposing rubberized cord fabric plies on the drum 15 to constitute the carcass 17 of the tire. The thick black tread 18 is then applied to the center of the carcass and firmly rolled down, whereupon two of the white rubber strips 14 with the red diamond decoration 13 thereon, prepared as described above, are wrapped around the two sides of the tire adjacent the tread 18 to constitute the sidewalls of the tire. The two edges or beads of the tire are then brought together and the center expanded to bring the tire into the usual toroidal shape.

The finished tire, after vulcanization in a mold, has the aspect shown in Fig. 3, in which, part of the tire is shown in section. The tread 18 is pressed by the contour of the mold into one of the many non-skid designs of which the lugs 19 form a part. The diamond-shaped figures 13, however, being made of unmasticated latex rubber, do not soften greatly when heated, as does the mill-mixed backing 14, and consequently retain their shape unchanged during vulcanization, being pressed into the softer backing by the smooth sidewall portions of the tire mold until they are flush with the surface. The red diamonds 13 make an unusually effective contrast with the white sidewall 14 and the black tread 18, the whole constituting a strikingly beautiful tire.

In another modification of my invention, a small anode plate, shown in Fig. 4, is made up of a solid metal plate 20 with a design engraved in one surface thereof. The design is illustrated as consisting of a rectangular border 21, a diamond-shaped figure 22, and a circle 23 therewithin. The surface of the plate with the exception of the engraved cavities is coated with an insulating coating 24, which prevents electrodeposition except in the said cavities. The plate is then suspended in an aqueous dispersion of rubber of an appropriate color and the cavities are filled with rubber by electrodeposition as described above, the electrodeposited rubber then being removed from the plate on an unvulcanized sheet rubber backing 25, shown in Fig. 5. The product is a bicolored, unvulcanized rubber medallion having a colored design 26, corresponding to the design of the plate 20, projecting above its surface. The medallion may be vulcanized as such, or it may be affixed to a rubber article such as an unvulcanized rubber boot or shoe and vulcanized therewith in open steam or heated air. The medallion may thus constitute the manufacturer's trade-mark on the rubber footwear. If, on the other hand, the rubber article with the medallion is vulcanized in a mold, the design 26 of unmasticated latex rubber is pressed into the soft, masticated backing 25, giving rise to a smooth-surfaced medallion such as that shown in Fig. 6.

The invention has been described above with relation to certain specific rubber articles, but it will be understood that it is quite generally applicable to the decoration of rubber goods. Sheet rubber may be provided with a colored design extending over a part or all of its surface, and may be used as such or built up into rubber articles. Alternatively the design may be applied to rubberized fabric instead of to rubber alone. Ornaments, medallions, labels, etc., of any size, color, and configuration desired, may be applied to rubber goods of any character. If such goods are subsequently vulcanized in steam or hot air, the design will appear in relief, whereas if the vulcanization takes place in a mold, the design is impressed into the rubber.

For example, ornaments or labels prepared according to this invention may be applied to such steam-cured goods as rubber acid gloves, rubber coatings or linings on metal articles, or on hot air cured goods such as rubber boots or shoes, as well as on molded rubber or rubber and fabric articles such as tires, tubes, belting, hose, bath caps, water bottles, rubber traffic markers, etc. In some cases it may be desirable to coat the surface of the rubber, including the ornamentation or design, with a layer of transparent rubber or other equivalent coating substance, but this will not ordinarily be required, since the design is quite durable and resistant to deteriorating influences.

The method of this invention not only eliminates the use of the cumbersome and expensive engraved calender rolls, engraved molds, etc., which have heretofore been required for ornamenting rubber or impressing lettering on it, but provides rubber articles with ornaments in any desired contrasting colors. It is therefore possible, by practicing this invention, to produce rubber goods in a practically unlimited range of designs and color combinations. It is even possible, by successively transposing two or more electrodeposited designs on a single backing, to produce rubber goods ornamented in a plurality of colors.

It is to be understood that the term "rubber" unless otherwise limited is employed in the appended claims in a generic sense to include caoutchouc, whether natural or synthetic, reclaimed rubber, balata, gutta-percha, rubber isomers, and like products whether or not associated with vulcanizing agents, pigments, or other compounding ingredients.

Although certain preferred methods of carrying out this invention have been described in considerable detail, it is to be understood that the invention is not limited thereto, for the process described is susceptible of numerous modifications and variations in its several parts, without exceeding the scope of this invention or of the appended claims.

I claim:

1. The method which comprises electrodepositing rubber from an aqueous dispersion thereof in the cavities of an engraved anode plate, transferring the deposited rubber to an unvulcanized rubber surface by adhesive contact therewith, and vulcanizing the rubber.

2. The method which comprises electrodepositing rubber of one color from a vulcanizable rubber latex on localized areas of an anode plate, transferring the deposited rubber to a sheet of unvulcanized rubber of another color by adhesive contact therewith, and vulcanizing the rubber.

3. The method which comprises electrodepositing rubber of one color from a vulcanizable rubber latex on localized areas of an anode plate, transferring the deposited rubber to a surface of unvulcanized, but vulcanizable, masticated rubber of another color, and vulcanizing the rubber in a mold.

4. The method which comprises electrodepositing rubber of one color from a vulcanizable rubber latex in the cavities of an engraved anode plate, transferring the deposited rubber to a sheet of unvulcanized, but vulcanizable, masticated rubber of another color by adhesive contact therewith, and vulcanizing the rubber in a mold.

5. A vulcanized rubber article made substantially of masticated rubber of one color having unmasticated, electrodeposited latex rubber of another color covering a portion only of its surface in a predetermined design flush with the remainder of the surface.

VIRGIL H. BODLE.